United States Patent [19]

Clague et al.

[11] 4,169,192

[45] Sep. 25, 1979

[54] LEAD-ACID STORAGE BATTERY HAVING Pb-Cd-Zn-Sn PLATE STRAPS

[75] Inventors: Robert E. Clague, Berkley; Richard H. Hammar, Fraser, both of Mich.

[73] Assignee: General Motors Corporation, Detroit, Mich.

[21] Appl. No.: 935,334

[22] Filed: Aug. 21, 1978

[51] Int. Cl.$^2$ ............................................. H01M 10/06
[52] U.S. Cl. ...................................... 429/122; 429/160; 429/161; 429/145; 75/166 D
[58] Field of Search ............... 429/160, 161, 178, 122, 429/204, 225, 228, 245, 226; 75/166 D, 166 C

[56] References Cited

U.S. PATENT DOCUMENTS

| 3,764,386 | 10/1973 | Mix | 429/161 |
| 3,791,874 | 2/1974 | Port | 429/160 |
| 4,007,056 | 2/1977 | Rao et al. | 429/122 X |
| 4,035,556 | 7/1977 | Duddy et al. | 429/245 |

*Primary Examiner*—Anthony Skapars
*Attorney, Agent, or Firm*—Lawrence B. Plant

[57] ABSTRACT

A maintenance-free, lead-acid storage battery including substantially antimony-free plate straps cast from an alloy consisting essentially of about 0.01 to about 1.5% by weight cadmium, about 0.4 to 1.5% by weight zinc, about 0.2 to 0.7% by weight tin and the balance lead.

2 Claims, No Drawings

LEAD-ACID STORAGE BATTERY HAVING PB-CD-ZN-SN PLATE STRAPS

BACKGROUND OF THE INVENTION

This invention relates to cast plate straps for lead-acid storage batteries, and more particularly, to antimony-free plate strap castings for so-called "maintenance-free", lead-acid batteries which, due to their non-antimonial or low-antimonial grid alloys, have a low self-discharge characteristic and lose little water during normal charge-discharge cycling.

The modern SLI lead-acid storage battery comprises essentially a case which is divided into a plurality of individual compartments or cells by partitions extending transverse the case. Each of these cells contains a plurality of electrochemically active plates comprising alternately stacked negative plates and positive plates separated one from the other by a microporous separator. Each plate includes an electrically conductive (e.g., metallic) skeletal support or grid for the electrochemically active plate material, which grid includes a conductive tab or lug projecting beyond (i.e., usually above) the periphery of the stack for electrically connecting each grid to like grids of the same polarity within the stack. In conventional fashion, the lugs for the positive plates are aligned each with the other and likewise for the lugs of the negative plates. Each aligned set of lugs are then electrically joined by fusion to a cast plate strap (i.e., either cast-on or pre-cast and burned on). The plate strap typically includes an intercell connector lug on one end thereof which serves to electrically join a plate strap of one polarity from one cell to a plate strap of opposite polarity in the next adjacent cell/compartment. This connection is popularly made beneath the cover for the case and most usually directly through an aperture formed in the partitions at about the plate strap level and below the electrolyte (i.e., $H_2SO_4$) level of the battery (e.g., See Matter et al U.S. Pat. No. 3,947,290).

There is a current trend toward making such batteries "maintenance-free", in that they require no water additions during their normal useful lives. Such maintenance-free batteries have been made possible by minimizing or eliminating antimony from the grid alloy of the battery plates. By substantially removing the antimony from the grids, the hydrogen overvoltage of the cell is raised and water loss by electrolysis during overcharge is significantly reduced to the point where the battery can be sealed (i.e., except for venting) with only some excess electrolyte provided to insure adequate service life. Typically modern maintenance-free grid alloys comprise Pb-Ca-Sn alloys. Though antimony has been substantially removed from the grid alloy, some manufacturers have retained significant amounts of it (i.e., 2% or more) in the plate straps which electrically join the positive plates together and the negative plates together in each cell of the battery. In this regard, the antimony improves castability and provides strength to the plate strap so that the strap and the intercell connector made from the strap lug can resist the high forces they experience in use primarily during periods of battery vibration. The antimony from the plate strap, however, can slowly dissolve into the electrolyte and eventually deposit on the negative plate which ultimately results in an increased tendency toward electrolysis of the water, which in turn can be translated into potentially shortened useful life of the battery. By removing substantially all antimony from the battery then, not only can life be extended, but the present requirement for extra electrolyte in the sealed batteries can be reduced, which in turn translates to reduced cost and lower weight batteries.

It is therefore an object of the present invention to provide a substantially antimony-free, lead-acid storage battery plate strap alloy which as cast: (1) has sufficient strength to withstand the forces experienced by the straps, (2) melts lower than the grid alloy, (3) is ductile, (4) does not significantly lower the hydrogen overvoltage of the cell, (5) has a low corrosion rate, (6) does not significantly affect battery performance or life and (7) is as economical as antimonial alloys. This and other objects and advantages of the present invention will become more readily apparent from the detailed description thereof which follows.

The plate strap alloy of the present invention meets all of the above requirements and comprises about 0.01% to about 1.5% by weight cadmium (preferably about 0.7% Cd), about 0.4% to about 1.5% by weight zinc (preferably 0.5% Zn), about 0.2% to about 0.7% by weight tin (preferably 0.3% Sn) and the balance essentially lead. Alloys prepared in accordance with the present invention may contain small amounts of impurities, including antimony, carried in by the lead and principal alloyants so long as they do not negate the principal affects of the present invention. Hence secondary leads which typically contain about 0.03% antimony are acceptable for plate straps made in accordance with this invention.

The alloys of the present invention are sufficiently strong and have ultimate tensile strengths in excess of about 18 MPa. The preferred alloy had an ultimate tensile strength of about 26 MPa. The ultimate tensile strength (UTS) of the alloys (i.e., tested at a strain rate of 1.27 mm/min.) were found to be linearly dependent on the cadmium and zinc content and in substantial accordance with the following relationship:

$$UTS = 10.95 + 12.18 \ (\% \ Cd) + 12.86 \ (\% \ Zn)$$

The equation shows the almost equal effect of cadmium and zinc on the ultimate tensile strength. Tin, on the other hand, was found to have very little effect on the ultimate tensile strength in the applicable tin concentration range.

Diamond penetration hardness (i.e., DPH) was found to be linearly dependent on the cadmium and zinc content in substantial accordance with the following relationship:

$$Hardness \ (DPH) = 5.07 + 4.34 \ (\% \ Cd) + 2.39 \ (\% \ Zn)$$

and the tin was found to have little or no effect. Hardness values greater than about 6.5 DPH are attained with these alloys with the preferred alloy having a hardness of about 9 DPH. Hardness testing was done using a Kentron Micro Hardness tester with a diamond pyramid and a 200 gram load. Cadmium was shown to be nearly twice as effective in increasing hardness as zinc. Moreover, the hardness tests showed that the lead-cadmium-zinc-tin alloys of the present invention did not age harden, thereby insuring uniform working properties in subsequent processing operations regardless of the age of the alloy. This is a particular advantage when the alloy is used to form intercell connectors according to the extrusion-fusion process described in Matter et al U.S. Pat. No. 3,947,290, filed Nov. 23, 1973 and assigned to the assignee of the present invention.

The lead-cadmium-zinc-tin alloys of the present invention are generally more ductile than the lead-antimony alloys previously used and have elongations varying between about 15% and 42%. The preferred alloy had an elongation of about 32%. Cadmium and tin were found to reduce the ductility of pure lead significantly according to the following relationship:

Elongation (%) = 44.16 − 15.87 (%Cd) − 6.16 (% Sn)

Zinc, on the other hand, had little or no effect on ductility. The ductility of the alloy was beneficial in the practice of the aforesaid Matter et al extrusion-fusion process. In this regard, the tests showed that the higher ductility lead-cadmium-zinc-tin alloys of the present invention had less tendency to produce shearing or punching defects during extrusion-fusion welding than do the lead-antimony alloys more typically used in this application. Though welded intercell connectors made with the plate strap alloy (i.e., with middle-high Cd content) of the present invention had a maximum shear stress (i.e., in torque testing) of only about 28 MPa as compared to about 43 MPa for Pb-Sb, the connectors were nonetheless acceptably strong enough. Higher strengths are possible by slightly increasing the size of the weldment.

Cadmium, tin and zinc all had the effect of linearly decreasing the melting point of lead according to the following relationship:

MP (° C.) = 328 − 9.3 (% Cd) − 11.1 (% Zn) − 2.7 (% Sn)

and the potential of achieving a solidification temperature range determined by the following relationship:

Liquidus-Solidus Range (° C.) = 1.7 + 20 (% Cd) + 1.5 (% Sn)

This range varied between about 9° and 30° C. depending primarily on the cadmium content. The preferred alloy had a solidification range of about 17° C. The melting point of the alloys varied between about 305° C. and about 318° C.

Corrosion in lead-acid batteries is manifested in two ways (i.e., total weight loss and intergranular corrosion). Owing to the normal size of plate straps, corrosion as manifested by weight loss, is not particularly a problem as the strap is not significantly weakened by this metal loss. Intergranular corrosion, however, is more important, as selected corrosion of grain boundaries (i.e., as measured by depth of corrosion in $\mu m$) can cause deep inroads to be made into the strap which not only weakens it but can reduce its current carrying capacity at higher discharge rates. In the alloy of the present invention, cadmium and zinc were shown to have an increasing affect on intergranular corrosive attack (i.e., ICA) while tin was shown to decrease such attack according to the following relationship:

$$ICA\ (\mu m) = \frac{10^{1.83}\ (\%\ Cd)^{0.205}\ (\%\ Zn)^{0.033}}{(\%\ Sn)^{0.084}}$$

From a processing standpoint, the alloy of the present invention was shown to be compatible with the art-known, cast-on-strap processes used by many battery manufacturers. According to this process, the plate strap is cast about and concurrently welded to lugs extending from the individual plates. As with all such processes, the temperature of the melt, the mold temperature, plate lug cleanliness and flux composition are important considerations in achieving good bonding between strap and lugs. Melt temperatures of about 510° C., mold temperatures of about 232° C., mechanical (i.e., filed and brushed) and chemical (i.e., 2:1 glacial acetic acid-30% $H_2O_2$) cleaning and fluxing (i.e., moist 3:1 $H_3PO_4$-$H_2O$) contributed to acceptable cast-on-bonded lugs-straps.

In general, tin contents of about 0.2 to 0.5% have a significant effect on reducing corrosion. Sn content above about 0.5% has a decreasing effectiveness on corrosion and cost becomes a significant factor to consider. In this light, Sn contents above about 0.7% are not seen to be justified. Zinc served to increase strength and hardness, and below about 1.0%, lowered the melting point. Above about 1.5% zinc, the melting point and extent of drossing is considered undesirably high to be practicably useful. Cadmium beneficially increases strength and hardness while lowering the melting point. In the presence of at least 0.2% Sn, low levels of Cd (0.1%) double intergranular corrosive attack. Further increases in Cd only slightly increase ICA. Cd is expensive, and accordingly, levels below about 0.7% (i.e., with a 0.3% Sn and 0.5% Zn) are necessary to be cost competitive with the popular Pb-Sb alloys.

While this invention has been disclosed solely in terms of specific embodiments thereof, it is not intended to be limited thereto but rather only to the extent set forth hereafter in the claims which follow.

The embodiments of the invention in which an exclusive property or privilege is claimed are defined as follows:

1. A lead-acid storage battery of the maintenance-free type comprising in combination: a case defining a plurality of enclosed cell compartments; an electrochemically active cell stack in each of said compartments and electrically series joined to like stacks in adjacent cell compartments; said cell stack including a plurality of positive plates and a plurality of negative plates interspaced between said positive plates, said positive and negative plates each being separated one from the other by a microporous separator; said plates comprising electrochemically active paste supported on a skeletal grid composed of substantially antimony-free alloy; each of said grids having a lug portion thereon protruding beyond the edge of the plate and aligned with like lugs on plates of like polarity within the cell stack; and cast plate straps fused to and spanning said aligned lugs for electrically connecting the plates in parallel, said straps consisting essentially of about 0.01% to about 1.5% by weight cadmium, 0.4% to about 1.5% by weight zinc, about 0.2% to about 0.7% by weight tin and the balance principally lead.

2. A lead-acid storage battery of the maintenance-free type comprising in combination: a case defining a plurality of enclosed cell compartments; an electrochemically active cell stack in each of said compartments and electrically series joined to like stacks in adjacent cell compartments; said cell stack including a plurality of positive plates and a plurality of negative plates interspaced between said positive plates, said positive and negative plates each being separated one from the other by a microporous separator; said plates comprising electrochemically active paste supported on a skeletal grid composed of substantially antimony-free alloy; each of said grids having a lug portion thereon protruding beyond the edge of the plate and aligned with like lugs on plates of like polarity within the cell stack; and cast plate straps fused to and spanning said aligned lugs for electrically connecting the plates in parallel, said straps consisting essentially of about 0.7% by weight cadmium, about 0.5% by weight zinc, about 0.3% by weight tin and the balance lead.

* * * * *